United States Patent
Alexander et al.

(10) Patent No.: US 6,327,733 B1
(45) Date of Patent: Dec. 11, 2001

(54) MECHANICALLY ACTUATED DOCK LEVELER WITH HYDRAULIC ASSIST

(75) Inventors: James C. Alexander; Richard B. Gowan, both of London (CA)

(73) Assignee: United Dominion IND, Inc., Charlotte, NC (US)

( * ) Notice: Subject to any disclaimer, the term of this patent is extended or adjusted under 35 U.S.C. 154(b) by 0 days.

(21) Appl. No.: 09/457,759

(22) Filed: Dec. 10, 1999

(51) Int. Cl.⁷ .................................................. E01D 1/00
(52) U.S. Cl. .................................................. 14/71.7; 14/71.3
(58) Field of Search ................................... 14/69.5, 71.1, 14/71.3, 71.7

(56) References Cited

U.S. PATENT DOCUMENTS

| | | | |
|---|---|---|---|
| 2,904,802 | * 9/1959 | Hartman | 14/71.1 |
| 3,454,974 | * 7/1969 | Kumpolt | 14/71.3 |
| 3,475,778 | * 11/1969 | Merrick et al. | 14/71.3 |
| 3,500,486 | * 3/1970 | Clear | 14/71.3 |
| 3,528,118 | * 9/1970 | Smith | 14/71.3 |
| 3,579,696 | * 5/1971 | Hecker, Jr. et al. | 14/71.3 |
| 3,584,324 | * 6/1971 | Merrick | 14/71.3 |
| 3,699,601 | * 10/1972 | Hecker, Jr. et al. | 14/71.1 |
| 3,835,497 | * 9/1974 | Smith | 14/71.3 |
| 3,982,295 | * 9/1976 | Burnham | 14/71.3 |
| 3,997,932 | 12/1976 | Artzberger . | |
| 4,081,874 | * 4/1978 | Artzberger | 14/71.7 |
| 4,097,949 | * 7/1978 | Barrett | 14/71.3 |
| 4,364,137 | * 12/1982 | Hahn | 14/71.3 |
| 4,800,604 | * 1/1989 | Alten | 14/71.3 |
| 4,827,549 | * 5/1989 | Walker | 14/71.7 |
| 4,922,568 | * 5/1990 | Hageman | 14/71.3 |
| 4,955,923 | * 9/1990 | Hageman | 14/71.7 |
| 5,042,103 | 8/1991 | Megens . | |
| 5,303,443 | * 4/1994 | Alexander | 14/71.1 |
| 5,323,503 | * 6/1994 | Springer | 14/71.3 |
| 5,440,772 | * 8/1995 | Springer et al. | 14/69.5 |
| 5,774,920 | 7/1998 | Alexander . | |
| 5,826,291 | 10/1998 | Alexander . | |
| 6,163,913 | * 12/2000 | DiSieno et al. | 14/71.3 |

* cited by examiner

Primary Examiner—Thomas B. Will
Assistant Examiner—Alexandra K. Pechhold
(74) Attorney, Agent, or Firm—Pepper Hamilton, LLP

(57) ABSTRACT

A pit type dock leveler having a frame adapted to be fixedly mounted at a dock with a deck, pivotedly mounted to the frame at one end thereof, and having a pivotable lip at the other end. A spring is mounted to the deck and the frame to support and raise the deck the deck. A hydraulic actuator is coupled to the deck and to a pivotable linkage member that is mounted to the frame. In a powered mode, the hydraulic unit acts as a power assist for the springs to move the deck from a generally horizontal stored position into an operative position. A control circuit is employed for controlling operation of the hydraulic actuator. In a manual mode, the linkage and the hydraulic unit act a pivoting follower to deck movement without any extension of the hydraulic unit.

20 Claims, 4 Drawing Sheets

MECHANICALLY ACTUATED DOCK LEVELER WITH HYDRAULIC ASSIST

This application is related to U.S. Pat. Nos. 5,774,920 and 5,826,291, commonly assigned.

BACKGROUND OF THE INVENTION

1. Field of the Invention

This invention relates to loading dock equipment and in particular to mechanically dock levelers using a power assist employing a hydraulic actuator to move the deck of the dock leveler. The invention also uses a linkage coupled to the hydraulic actuator to allow the leveler to operate in a manual mode of operation. This invention is also related to the hydraulic and electrical circuitry used to operate the dock leveler.

2. Prior Art

Dock levelers employ a variety of techniques to raise the deck from a stored horizontal position to an elevated position where the lip can extend and the deck then "walked down" into position. Pit-style dock levelers are manufactured in a wide range of models to meet various requirements of size, capacity and performance. They can be divided into a number of different types as a function of the mode of power. Mechanical dock levelers are the most common because of their simplicity. They are widely available and for reference purposes U.S. Pat. No. 3,997,932 illustrates one example of such a mechanical dock leveler.

This type of dock leveler employs different techniques of powering the device. Manual lift mechanical dock levelers are common and again, simple. However, operation requires the user bending over and lifting the chain to release the unit. Another common type is the walk-down mechanical dock leveler. This requires less effort since the device is biased upward and the weight of the user "walks down" the device. However, the hold down requires maintenance and adjustment is required to maintain accurate spring balance.

There is a tendency in the industry toward automation to avoid physical strain and enhance loading dock operations. Thus it would be preferable to have remote actuation by push button without involving dock personnel in the manipulation of the leveler by pulling chains and the like to initiate operation.

A second type is the hydraulic dock leveler which features ease of use but at higher complexity due to the hydraulics which are employed as the exclusive mode of power. A variant is the hydraulic dock leveler with mechanical lip extension. This device has moderate complexity when compared with a hydraulic dock leveler with hydraulic lip extension. The latter device provides better control of lip motion but at a higher degree of complexity compared with those having mechanical lip extension.

Contemporary issues dealing with ease of use of these industrial products indicate a trend to move away from manually operated dock levelers. However riot all applications can justify the complexity and maintenance requirements of a hydraulic dock leveler. Also, some customers such as food and other environmentally conscious industries prefer non-hydraulic products to eliminate potential problems from hydraulic fluid spills. Certain non-standard fluids can be employed but require re-engineering and customization.

One device being offered to meet these demands replaces the hydraulic system with a blower and inflatable air bag to raise the dock leveler. This is illustrated in one form in U.S. Pat. No. 5,042,103. While this design provides a solution to some of the needs in the industry, it has unique operating characteristics. First, the air bag occupies most of the pit, making visual inspection and cleaning of the pit more time consuming. It will be appreciated that debris and the like frequently collect around the pit area and this area needs to be maintained clear of debris. Secondly, the air bag lift system does not have a capability to hold the leveler in a raised position for an "Emergency Stop" condition. Third, this type of leveler requires two people to install a support post under the leveler for maintenance, one to press the "Raise" button and one to place the support post under the deck.

Other configurations have been proposed using a large electric actuator to replace the hydraulic system, but large actuators, commercially available, are more expensive than hydraulic systems. Consequently, there exists in the dock loading industry a need for a simple yet powered assisted dock leveler.

In U.S. Pat. Nos. 5,826, 291 and 5,774,920 the assignee disclosed the use of an electric actuator as the source of power to assist in the operation of raising the deck as an alternative for these higher powered systems. In the '291 patent an electric actuator is to power assist a "manual lift" dock leveler. Since the least expensive type of mechanical pit-style dock leveler is this type the use of a power assist is a logical extension of the technology. Mechanical springs are used to partially offset the weight of the deck but the deck is still downward biased. The springs are used to reduce the force required by the electric actuator since the cost of actuators with lifting capacities over 1000 pounds would not provide an advantage over conventional hydraulic dock levelers. Also, the spring counterbalance enables the deck to be lifted by hand for maintenance or when electrical power is lost. The electric actuator provides a clean source of power and leaves the dock leveler pit open for easy inspection and cleaning.

Unlike a hydraulic cylinder which can "float" in response to external force, an electric actuator of the '291 patent cannot be forced follow the up and down motion of a dock leveler with the lip resting on a trailer. The use of an electric actuator conventionally requires separate control buttons to extend and retract the mechanism.

The use of an electric actuator also raises problems of alignment of the actuator and electrical wiring and cost considerations. If the source of power was interrupted the unit would not function. Moreover, when the leveler is restored to the cross-traffic position but is not fully restored, vibration and shock loads attendant with fork lift truck operation on the deck the electrical actuator may damage the unit. That is, the lip may not be fully seated in the lip keepers to support the deck so that the load will be carried by the electric actuator mechanical structure. In this circumstance the electric actuator will be subjected to the forces caused by movement of fork lift vehicles and the like on the deck until the unit settled into a horizontal position by repeated loads. Those forces would be beyond the rated capacity of the actuator and could damage the unit.

Consequently the need exists for a device offering the power assist of the '920 technology that is robust for the environment of the loading dock, yet reliable and cost effective.

It is an object of this invention to provide a mechanical dock leveler using simple hydraulic actuator technology to assist in raising the deck and requires less power for the actuator.

Yet another object of this invention is to define a simple actuator that employs a linkage member allowing the deck to be raised either hydraulically or manually and when manually operated will be self supporting in the absence of hydraulic power.

It is another object of this invention to define a method of control where the dock leveler utilizing simple controls with a minimum of switches.

Still another object of this invention is to define an operating system using standard 110 volt components.

SUMMARY OF INVENTION

In accordance with this invention a pit type dock leveler has a frame adapted to be fixedly mounted at a dock with a deck, pivotally mounted to the frame at one end thereof, and having a pivotable lip at the other end. A spring is mounted to the deck and the frame and supports the deck. A hydraulic actuator is coupled at one to the deck and at the other end to a linkage member. The hydraulic actuator augments the spring bias to assist in moving the deck from a generally horizontal stored position into an operative position. The hydraulic actuator is matched to have a lifting capacity sufficient to allow for power assist of the weight of the deck not counterbalanced by the springs.

A control circuit is employed for controlling operation of the dock leveler by initiating the hydraulic actuator. This invention has an improved control system which allows the leveler to float yet does not require a long stroke actuator to fully retract after each operation. This significantly reduces the time delay from pushing the button until the leveler starts to raise.

This invention also provides for a manual mode of operation when the hydraulics are not functioning. A linkage member is coupled to the hydraulic member and serves as a brace that pivots into position. Thus the operation of device extends the hydraulic member and the linkage member into position as the deck is elevated. However, when the hydraulic cylinder is retracted and inoperative, the linkage member still pivots into position as the deck is manually raised using the springs. This pivoting action between the linkage and the hydraulics allows the deck to move without having to manually extend the hydraulic cylinder. That is, the combination of the linkage and the cylinder acts as a passive follower of deck movement allowing the unit to be manually operated.

This invention will be described with reference to the drawing and the description of the preferred embodiment that follows.

DESCRIPTION OF THE PREFERRED EMBODIMENT

Figure 1:
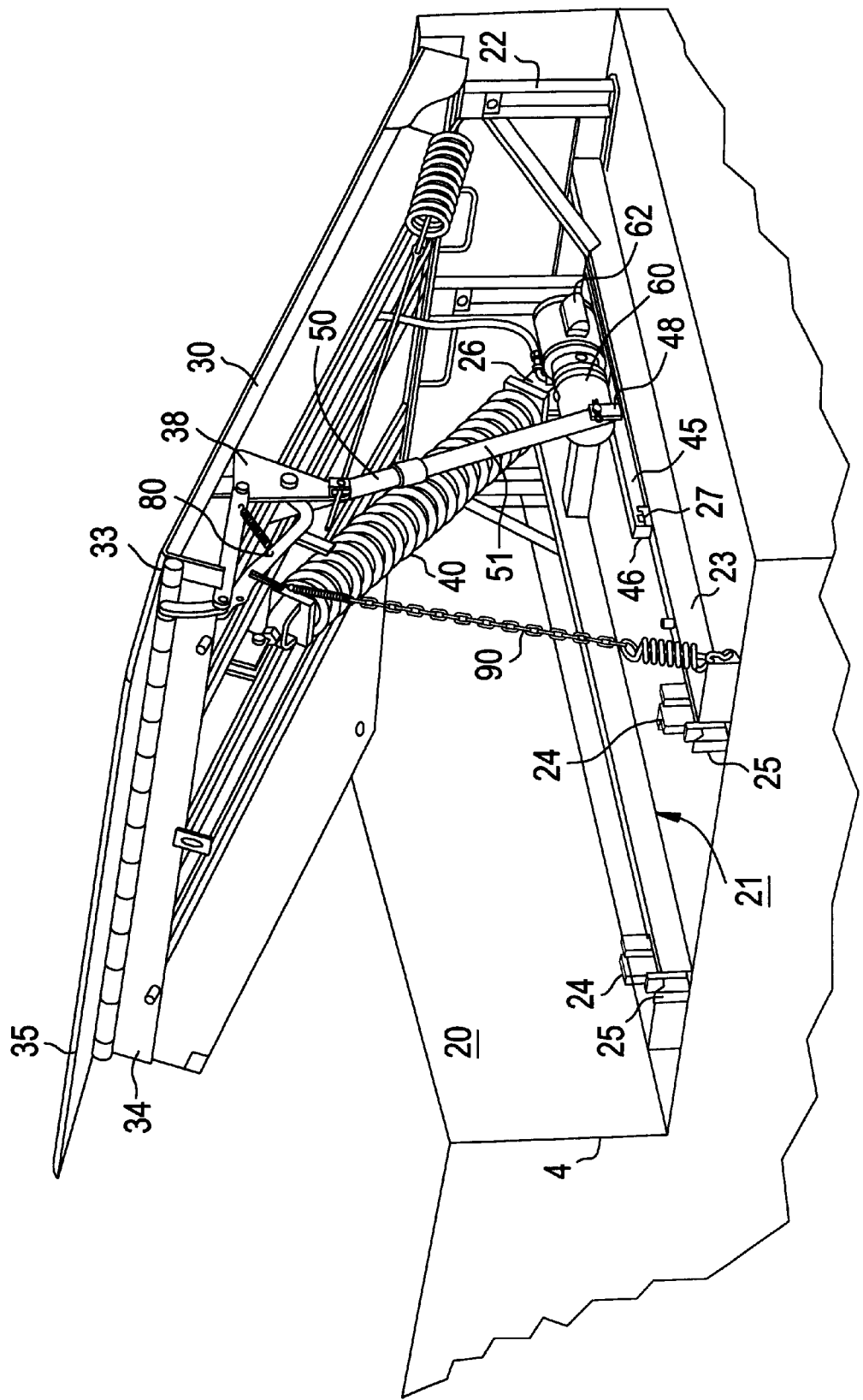
FIG. 1 is partial side view of the dock leveler and the hydraulic actuator partially extended to raise the dock leveler.

Referring now to FIG. 1, a perspective view of a typical dock leveler of this invention is depicted. A dock leveler 20 has a frame 21 attached to the pit 4. The frame has vertical back frame members 22 with holes for the hinge pivot pin 32 near the top. Horizontal frame members 23 extend forward to the front of the pit 4 and have ramp stops 24 and lip keepers 25. A deck 30 has rear hinge supports 31. The deck 30 is attached to the frame 21 by a hinge pin 32.

Referring to FIG. 1 lip hinge tubes 33 are fastened to the front bar 34 of the deck assembly. A lip 35 is connected to the deck hinge tubes by a lip hinge pin 36. The end of the lip rests in the lip keepers 25 and supports the deck assembly in the stored "cross-traffic" position. A spring assembly 40 is fastened to brackets 26 on the frame 21 by a pin 42 and to brackets 37 on the deck assembly by a pin 43. The spring assembly 40 is employed to support a substantial amount of the weight of deck assembly so that the actuator force used to assist in raising the deck is small. The spring assembly supports the deck throughout the entire range of travel. By way of example, the spring assembly may be selected to support 60% to 80% of the deck weight.

A hydraulic actuator 50 with an extendible rod 51 is fastened to brackets 38 on the deck 30 by a pin 44. A pivotable linkage member 45 is fastened by a pin 46 to brackets 27 on the frame 20 at one end and at the other to the hydraulic actuator by a pin 47 coupled to brackets 48. The majority of the weight of the deck 30 is carried by the counterbalancing force of the spring assembly 40. Consequently, the size of the actuator 50 is required to provide only the extra force not provided by the spring 40 to raise the deck.

Figure 3:
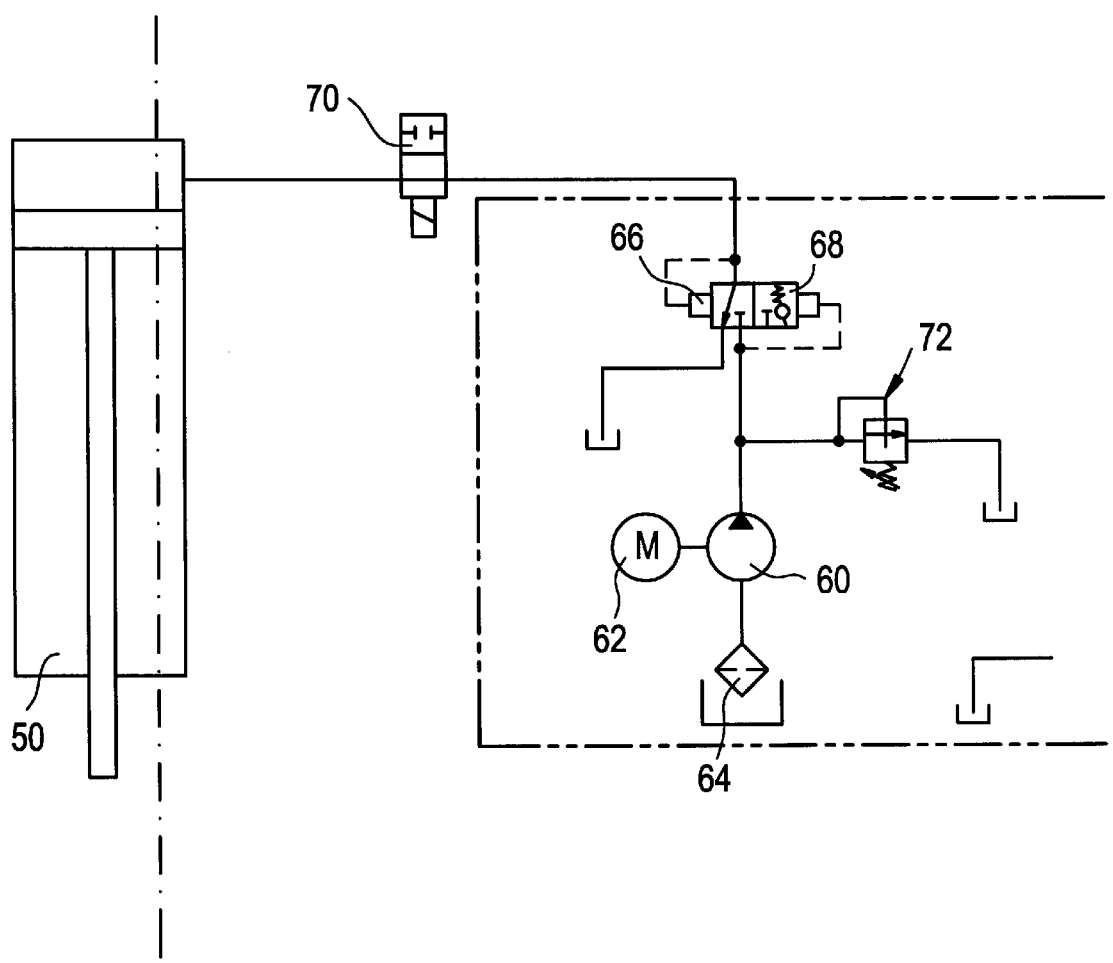
FIG. 3 is a circuit diagram of the hydraulic control circuit which provides single button operation of the dock leveler.

As illustrated in FIG. 3, the hydraulic cylinder 50 is coupled to the pump 60 which is powered by an electric motor 62. Since the load requirement of the hydraulics is relatively small, a small motor, typically ⅓ horsepower may be used to drive the pump.

When the leveler is actuated, the force of the springs plus the action of the hydraulic cylinder on the bracket 48 forces the linkage member against the frame 4 so it does not raise. The extension of the hydraulic unit is sufficient to span the distance between the deck and the frame as the device is raised. The linkage member remains horizontal on the side of the frame.

Figure 2:
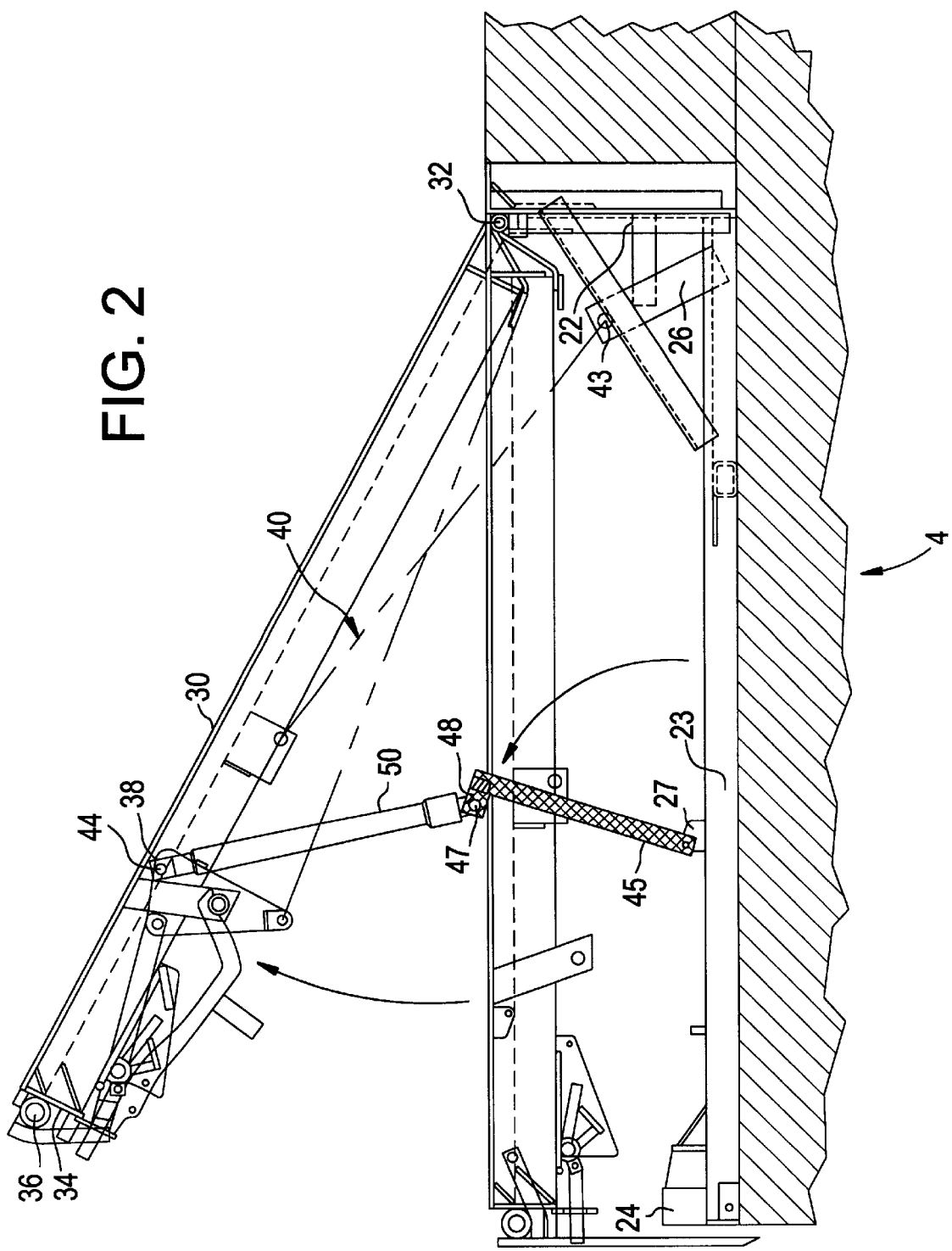
FIG. 2 is partial side view of the dock leveler when the hydraulic actuator is inoperative and the deck is manually raised to operate the dock leveler.

FIG. 2 illustrates the condition where the hydraulic member 50 is inoperative and the deck 30 is manually raised. The linkage member 45 and the actuator 50 follow movement of the deck in a passive manner. FIG. 2 illustrates the device with the deck in an elevated position. Since the hydraulic unit is not extended there would be a limit on deck movement unless the hydraulic cylinder could be manually extended. The linkage member provides that ability to raise the deck. The linkage member 45 acting as a folding pivotal element with the hydraulic cylinder permits the deck to be manually moved using only the spring force of the compression spring. Consequently manually operation can occur as though the hydraulic unit was an inextensible member.

Figure 4:
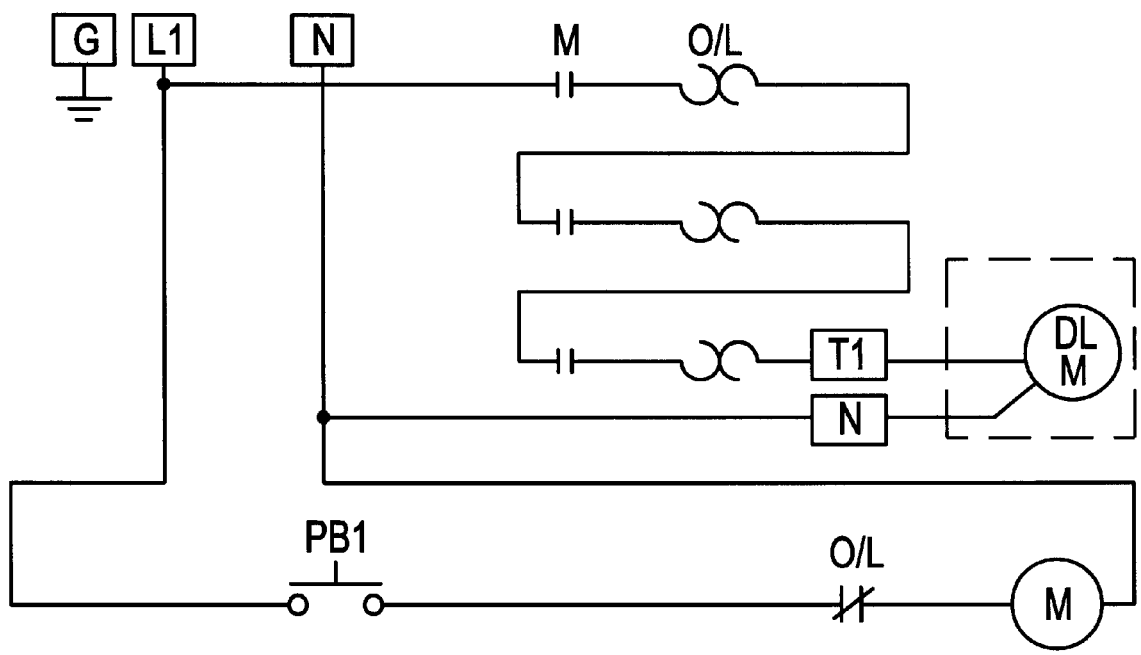
FIG. 4 is a circuit diagram of the invention.

A typical hydraulic actuator for this application requires standard 115 V line current as opposed to the 3-phase wiring associated with customary heavy lifting units common for dock levelers. The circuitry is illustrated in FIG. 4. The single push button PB1 is used to initiate operation. A conventional overload O/L is coupled to the motor relay coil M. Conventionally three contacts couple the motor DL-M to the power source.

The operation of the system will be described relative to FIGS. 1 and 2. The push button PB1 initiates operation by activating the hydraulics to power assist the raising of the deck. When the deck is fully raised as shown in FIG. 1 or FIG. 2, the lip is then extended by a conventional lip extension mechanism 80 with a chain 90 coupled to the frame 21 to extend the lip 35. The mechanism causes the lip 35 to extend from a pendent position as the deck is raised so that as illustrated in FIG. 1 the lip extends outwardly. When the pushbutton is released, the deck then falls by gravity and the hydraulic cylinder retracts until the lip 35 rests on the bed of a vehicle.

When the loading dock operations are completed, the dock leveler is restored in the same manner as it was extended. When the button PB1 on the panel is pressed, the actuator extends and lifts the deck, allowing the lip to fall. The operator then releases the button before the deck is raised high enough to cause the lip to extend and the deck falls by gravity and the hydraulic actuator rod 51 retracts. The dock leveler lowers until the tip of the lip 35 rests on the lip keepers as shown in FIG. 1. In this mode of operation the linkage member 45 remains retracted against the frame member 23.

The hydraulic control circuit of FIG. 3 is illustrated with the hydraulic cylinder 50 in fluid communication with a source of fluid 64 via the pump 60 driven by motor 62. This is the same motor as illustrated in the electrical schematic of FIG. 4 as element DL-M. The output of the pump is delivered to a shuttle valve 66 having a pilot check valve 68. In FIG. 3, a spool valve 70 may be optionally used to achieve the automatic stop of the deck. A pressure relief valve 72 is also employed.

In operation, the motor 62 actuates the pump 60 to pressurize the system. The shuttle valve 66 is driven to establish fluid communication with the cylinder 50 causing it to extend. When the cylinder 50 is fully extended pressure builds and the relief valve 72 opens at a predetermined pressure dumping hydraulic fluid back to the reservoir 64.

The pilot check valve 68 prevents any back-flow of fluid to the pump in the case of a power failure. The purpose of the spool valve 70 is to provide the ability to stop movement of the deck by terminating the flow of hydraulic fluid to the cylinder when the valve is actuated. This isolates the cylinder holding it in position. When the spool valve 70 is deactivated, fluid communication is again established so that the deck may be raised or lowered.

In the manual mode of operation illustrated in FIG. 2, the operation of the lip is the same since the motion is a function of movement of the deck. Instead of using the power assist offered by the hydraulic unit, the deck is manually lifted to extend the lip. In this mode of operation the linkage member 45 extends as the leveler is raised. The combination of the hydraulic cylinder 50 and the linkage 45 act as a follower allowing the deck to elevate even though the hydraulic cylinder cannot extend.

While this invention has been described with respect to the preferred embodiment it is apparent that modifications of the invention are within the scope of this invention.

I claim:

1. A dock leveler comprising:
    a frame adapted to be fixedly mounted at a dock;
    a deck, pivotally mounted to said frame at one end thereof, and having a pivotable lip at the other end thereof;
    a spring attached to said deck and said frame to raise and provide primary support for said deck,
    a hydraulic actuator coupled at one end to said deck to provide a power assist during raising of the deck,
    a linkage member pivotally coupled at one end to said frame and at another end to said hydraulic actuator, wherein
    said hydraulic actuator supplements said spring to assist in moving said deck from a generally horizontal stored position into an operative position while said linkage member remains retracted, and said linkage member operable to allow said deck to be raised manually when said hydraulic member is not operative and said leveler is elevated manually by upward pivotal movement using said inoperative hydraulic member as a link between said frame and said deck.

2. A dock leveler according to claim 1 wherein said hydraulic actuator comprises a piston and cylinder, an electric motor, a source of electrical power, pump means driven by said electric motor for driving said actuator in a first direction until said deck is lifted, and a hydraulic circuit including means to reverse the movement of said actuator to allow said deck to lower.

3. A dock leveler according to claim 2 wherein said hydraulic circuit comprises a shuttle valve interposed between said pump means and said hydraulic actuator.

4. A dock leveler according to claim 3 further comprising a spool valve between said hydraulic cylinder and said shuttle valve.

5. A dock leveler according to claim 4 further comprising a relief valve between said pump and said shuttle valve.

6. A dock leveler according to claim 3 wherein said shuttle valve includes a pilot check valve.

7. A dock leveler according to claim 2 further comprising an electrical circuit, said electrical circuit comprising a switch and a relay, wherein when said switch is closed said relay is energized to power said electric motor and thereby move said hydraulic actuator.

8. A dock leveler according to claim 1 wherein said linkage member is pivotally coupled to said frame and is stored adjacent to said frame when said deck is raised to said operative position using power assistance from said hydraulic actuator.

9. A dock leveler according to claim 1 wherein said linkage member comprises a rod carrying brackets at an end coupled to said hydraulic unit and a bracket on said frame to pivotally mount said linkage member to said frame.

10. A dock leveler according to claim 1, further comprising a chain to extend said lip.

11. A pit type dock leveler comprising:
    a frame fixedly mounted in a pit at a dock;
    a pivotal deck mounted to said frame at one end of the deck;
    a spring coupled to said frame and said deck to support and raise said deck,
    a linkage member pivotally mounted to said frame, and
    a hydraulic actuator pivotally coupled to said deck and said linkage member, said hydraulic actuator powered to assist raising said deck to an operative position while the linkage member is retracted, and said linkage member pivotally alters position acting as a follower to said hydraulic actuator when said hydraulic actuator is inoperative, to allow said deck to be manually raised by pivotal movement using said inoperative hydraulic actuator as a link between said frame and said deck.

12. A pit type dock leveler according to claim 11 wherein said hydraulic actuator comprises a piston and cylinder, an electric motor, a source of electrical power, pump, means driven by said electric motor for driving said actuator in a first direction until said deck is lifted, and a hydraulic circuit including means to reverse movement of said actuator to allow said deck to lower.

13. A pit type dock leveler according to claim 12 wherein said hydraulic circuit comprises a shuttle valve interposed between said pump means and said hydraulic actuator.

14. A pit type dock leveler according to claim 13 further comprising a spool valve between said hydraulic cylinder and said shuttle valve.

15. A pit type dock leveler according to claim 14 further comprising a relief valve between said pump means and said shuttle valve.

16. A pit type dock leveler according to claim 13 wherein said shuttle valve includes a pilot check valve.

17. A pit type dock leveler according to claim 12 further comprising an electrical circuit, said electrical circuit comprising a switch and a relay, wherein when said switch is closed said relay is energized to power said electric motor and thereby move said hydraulic actuator.

18. A pit type dock leveler according to claim 11 wherein said linkage member is pivotally coupled to said frame and is stored adjacent to said frame when said deck is raised to said operative position using power assistance from said hydraulic actuator.

19. A dock leveler according to claim 11 wherein said linkage member comprises a rod carrying brackets at an end coupled to said hydraulic unit and a bracket on said frame to pivotally mount said linkage member to said frame.

20. A dock leveler according to claim 11, further comprising a chain to extend a lip.

* * * * *